US012322398B2

(12) United States Patent
Shlomot et al.

(10) Patent No.: US 12,322,398 B2
(45) **Date of Patent: *Jun. 3, 2025**

(54) METHOD AND APPARATUS FOR DETERMINING WEIGHTING FACTOR DURING STEREO SIGNAL ENCODING

(71) Applicant: HUAWEI TECHNOLOGIES CO., LTD., Guangdong (CN)

(72) Inventors: Eyal Shlomot, Long Beach, CA (US); Haiting Li, Beijing (CN); Zexin Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,694

(22) Filed: Feb. 2, 2024

(65) Prior Publication Data

US 2024/0274136 A1 Aug. 15, 2024

Related U.S. Application Data

(63) Continuation of application No. 18/065,043, filed on Dec. 13, 2022, now Pat. No. 11,922,958, which is a (Continued)

(30) Foreign Application Priority Data

Jun. 29, 2018 (CN) ........................ 201810713019.9

(51) Int. Cl.
*G10L 19/008* (2013.01)
*G10L 19/032* (2013.01)

(52) U.S. Cl.
CPC .......... *G10L 19/008* (2013.01); *G10L 19/032* (2013.01)

(58) Field of Classification Search
CPC . G10L 19/008; G10L 19/167; G10L 19/0204; G10L 19/032; G10L 19/18; G10L 19/04; H04S 2420/03

(Continued)

(56) References Cited

U.S. PATENT DOCUMENTS 5,293,449 A * 3/1994 Tzeng ..................... G10L 19/10 704/223
6,931,373 B1 * 8/2005 Bhaskar .................. G10L 19/08 704/219

(Continued)

FOREIGN PATENT DOCUMENTS

CN 101004916 A 7/2007
CN 101547010 A 9/2009

(Continued)

OTHER PUBLICATIONS

Hai Xu et al., A Loosely Synchronous-Coded OFDM System for Power-Line Communications in Home Networks, IEEE Transactions on Power Delivery, vol. 21, No. 4, Oct. 2006, 7 pages.

(Continued)

*Primary Examiner* — Alexander Krzystan

(57) ABSTRACT

Various embodiments provide a method and an apparatus for determining a weighting factor during stereo signal encoding. In those embodiments, a parameter value corresponding to the encoding mode of the to-be-encoded signal is determining based on an encoding mode of a to-be-encoded signal in a stereo signal and a correspondence between an encoding mode and a parameter value. Based on the determined parameter value and an energy spectrum of a linear prediction filter corresponding to an original line spectral frequency parameter of the to-be-encoded signal is a weighting factor for calculating a distance between the original line (Continued)

spectral frequency parameter and a target original line spectral frequency parameter is calculated.

20 Claims, 3 Drawing Sheets

Related U.S. Application Data continuation of application No. 17/136,028, filed on Dec. 29, 2020, now Pat. No. 11,551,701, which is a continuation of application No. PCT/CN2019/093402, filed on Jun. 27, 2019.

(58) Field of Classification Search
USPC .................................. 381/22, 23, 20; 700/94
See application file for complete search history.

(56) References Cited

U.S. PATENT DOCUMENTS

| | | | | |
|---|---|---|---|---|
| 6,996,523 | B1 * | 2/2006 | Bhaskar | G10L 19/097 704/219 |
| 7,013,269 | B1 * | 3/2006 | Bhaskar | G10L 19/097 704/219 |
| 2004/0102966 | A1 | 5/2004 | Sung et al. | |
| 2008/0027711 | A1 | 1/2008 | Rajendran et al. | |
| 2008/0177532 | A1 * | 7/2008 | Greiss | G10L 21/038 704/E21.009 |
| 2010/0174539 | A1 * | 7/2010 | Nandhimandalam | G10L 19/038 704/E19.001 |
| 2011/0295598 | A1 * | 12/2011 | Yang | G10L 21/038 704/205 |
| 2016/0196829 | A1 | 7/2016 | Liu et al. | |
| 2016/0275959 | A1 * | 9/2016 | Choo | G10L 19/167 |
| 2021/0118456 | A1 | 4/2021 | Shlomot et al. | |
| 2023/0119826 | A1 | 4/2023 | Shlomot et al. | |

FOREIGN PATENT DOCUMENTS

| | | | |
|---|---|---|---|
| CN | 101583995 | A | 11/2009 |
| CN | 103050121 | A | 4/2013 |
| CN | 103180899 | A | 6/2013 |
| CN | 103824561 | A | 5/2014 |
| CN | 105637583 | A | 6/2016 |
| EP | 1105871 | A1 | 6/2001 |
| EP | 3029670 | A1 | 6/2016 |
| WO | 0011655 | A1 | 3/2000 |
| WO | 2014190641 | A1 | 12/2014 |

OTHER PUBLICATIONS

Zhang Yong, Research on Key Techniques of Mobile Audio Coding and Decoding, Wuhan University, 2013, Issue 09, 2 pages(abstract).

Hai Le Vu et al, Efficient Distance Measure for Quantization of LSF and Its Karhunen-Loeve Transformed Parameters, IEEE Transactions on Speech and Audio Processing, vol. 8, No. 6, Nov. 2000, total 3 pages.

Examination Report issued in IN202037055792, dated Jan. 17, 2022, 6 pages.

Office Action issued in CN201810713019.9, dated Aug. 11, 2021, 7 pages.

Extended European Search Report issued in EP 19825140.7, dated Jul. 15, 2021, 11 pages.

* cited by examiner

METHOD AND APPARATUS FOR DETERMINING WEIGHTING FACTOR DURING STEREO SIGNAL ENCODING

CROSS-REFERENCE TO RELATED APPLICATIONS

This application is a continuation of U.S. patent application Ser. No. 18/065,043, filed on Dec. 13, 2022, which is a continuation of U.S. patent application Ser. No. 17/136,028, filed on Dec. 29, 2020, now U.S. Pat. No. 11,551,701, which is a continuation of International Application No. PCT/CN2019/093402, filed on Jun. 27, 2019, which claims priority to Chinese Patent Application No. 201810713019.9, filed on Jun. 29, 2018. All of the afore-mentioned patent applications are hereby incorporated by reference in their entireties.

TECHNICAL FIELD

This disclosure relates to the audio field, and more specifically, to a method and an apparatus for determining a weighting factor during stereo signal encoding.

BACKGROUND

In a time-domain parametric stereo encoding technology for stereo signals, an encoder end downmixes a time-domain left channel signal and a time-domain right channel signal into a primary channel signal and a secondary channel signal, and then encodes the primary channel signal and the secondary channel signal separately.

For encoding of a primary channel signal and encoding of a secondary channel signal, during quantization of a line spectral frequency (LSF) parameter, it is necessary to estimate spectral distortion between a to-be-quantized LSF parameter and an LSF parameter corresponding to each codeword in a codebook used for LSF parameter quantization, and then an LSF parameter that is corresponding to a codeword and that is with minimum spectral distortion is selected from the codebook used for LSF parameter quantization and is used as a quantized LSF parameter.

Usually, a weighted distance between the to-be-quantized LSF parameter and the LSF parameter corresponding to each codeword in the codebook used for LSF parameter quantization may be calculated, to estimate spectral distortion between the to-be-quantized LSF parameter and the LSF parameter corresponding to each codeword in the codebook used for LSF parameter quantization.

For example, a weighted distance between the to-be-quantized LSF parameter and an LSF parameter corresponding to an $n^{th}$ codeword in the codebook used for LSF parameter quantization satisfies the following:

$$WD_n^2 = \sum_{i=1}^{M} w_i[LSF(i) - LSF_n^q(i)]^2$$

where $LSF_n^q$ is the LSF parameter corresponding to the $n^{th}$ codeword in the codebook used for LSF parameter quantization; LSF is the to-be-quantized LSF parameter; LSF(i) is an $i^{th}$ LSF component in the to-be-quantized LSF parameter; i is an index of a vector, where i=1, . . . , M, and M is a linear prediction order; and $\{w_i|i=1, \ldots, M\}$ is a weighting factor.

In the prior art, for a time-domain stereo encoder that needs to separately encode a primary channel signal and a secondary channel signal in a stereo signal, a unified method is used to calculate a weighting factor that is used for quantizing all LSF parameters in the stereo signal, for example, by using a Euclidean distortion measure method used in 3GPP AMR speech encoding standards, a method based on an inverse harmonic mean (inverse harmonic mean) method, or a method in 3GPP EVS audio encoding and decoding. This is not conducive to implementing optimization of encoding quality of the entire stereo signal.

SUMMARY

Various embodiments provide a method and an apparatus for determining a weighting factor during stereo signal encoding, to help improve encoding quality of a stereo signal.

According to a first aspect, a method for determining a weighting factor during stereo signal encoding is provided, including: determining, based on an encoding mode of a to-be-encoded signal in a stereo signal and a correspondence between an encoding mode and a parameter value, a parameter value corresponding to the encoding mode of the to-be-encoded signal, where the encoding mode includes at least one of the following encoding modes: an encoding rate, an encoding bandwidth, a channel number, or a manner of obtaining a target line spectral frequency parameter of the to-be-encoded signal, and the manner of obtaining the target line spectral frequency parameter of the to-be-encoded signal includes at least one of the following manners: obtaining the target line spectral frequency parameter of the to-be-encoded signal by quantizing an original line spectral frequency parameter of the to-be-encoded signal, or obtaining the target line spectral frequency parameter of the to-be-encoded signal through prediction; and calculating a weighting factor based on the parameter value corresponding to the encoding mode of the to-be-encoded signal and a energy spectrum of a linear prediction filter that is corresponding to the original line spectral frequency parameter of the to-be-encoded signal, where the weighting factor is used for calculating a distance between the original line spectral frequency parameter and the target original line spectral frequency parameter.

In this implementation, different parameter values are selected based on different encoding modes to calculate the weighting factor. This helps improve accuracy of the target LSF parameter obtained for the to-be-encoded signal through calculation based on the weighting factor, thereby helping reduce spectral distortion of the target LSF parameter of the to-be-encoded signal, and further helping improve encoding quality of the stereo signal.

With reference to the first aspect, in a first possible implementation, the parameter value corresponding to the encoding mode of the to-be-encoded signal, the energy spectrum of the linear prediction filter that is corresponding to the original line spectral frequency parameter of the to-be-encoded signal, and the weighting factor satisfy the following:

$$w_i = \|A(LSF(i))\|^{-p}$$

where $w_i$ represents the weighting factor; $A(\cdot)$ represents the energy spectrum of the linear prediction filter; LSF represents a vector of the original line spectral frequency parameter; i represents an index of the vector, where 1≤i≤M, and M is a linear prediction order; p represents the parameter value corresponding to the encoding mode of the to-be-encoded signal; and $\|\cdot\|^{-p}$ represents solving a 2-norm, which is of the vector, to the power of −p, where p is a number greater than 0 and less than 1.

With reference to the first aspect or the first possible implementation, in a second possible implementation, when the encoding mode includes the encoding rate and the channel number, the correspondence between the encoding mode and the parameter value includes at least one of the following relationships: When the channel number indicates that the to-be-encoded signal is a primary channel signal, and the encoding rate is less than or equal to 14 kilobits per second, the parameter value is 0.25; when the channel number indicates that the to-be-encoded signal is a primary channel signal, and the encoding rate is equal to 18 kilobits per second, the parameter value is 0.22; when the channel number indicates that the to-be-encoded signal is a primary channel signal, and the encoding rate is equal to 22 kilobits per second, the parameter value is 0.16; when the channel number indicates that the to-be-encoded signal is a primary channel signal, and the encoding rate is equal to 26 kilobits per second, the parameter value is 0.16; when the channel number indicates that the to-be-encoded signal is a primary channel signal, and the encoding rate is greater than or equal to 34 kilobits per second, the parameter value is 0.17; when the channel number indicates that the to-be-encoded signal is a secondary channel signal, and the encoding rate is less than or equal to 14 kilobits per second, the parameter value is 0.19; when the channel number indicates that the to-be-encoded signal is a secondary channel signal, and the encoding rate is equal to 18 kilobits per second, the parameter value is 0.18; when the channel number indicates that the to-be-encoded signal is a secondary channel signal, and the encoding rate is equal to 22 kilobits per second, the parameter value is 0.11; when the channel number indicates that the to-be-encoded signal is a secondary channel signal, and the encoding rate is equal to 26 kilobits per second, the parameter value is 0.17; or when the channel number indicates that the to-be-encoded signal is a secondary channel signal, and the encoding rate is greater than or equal to 34 kilobits per second, the parameter value is 0.24.

With reference to the first aspect or the first possible implementation, in a third possible implementation, when the encoding mode includes the encoding rate, the channel number, and the manner of obtaining the target line spectral frequency parameter, the correspondence between the encoding mode and the parameter value includes at least one of the following relationships: When the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is less than or equal to 14 kilobits per second, the parameter value is 0.25; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 18 kilobits per second, the parameter value is 0.22; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 22 kilobits per second, the parameter value is 0.16; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 26 kilobits per second, the parameter value is 0.16; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is greater than or equal to 34 kilobits per second, the parameter value is 0.17; when the channel number indicates that the to-be-encoded signal is a secondary channel signal, the manner of obtaining the target line spectral frequency parameter is obtaining the target line spectral frequency parameter of the to-be-encoded signal through prediction, and the encoding rate is less than or equal to 14 kilobits per second, the parameter value is 0.17; when the channel number indicates that the to-be-encoded signal is a secondary channel signal, the manner of obtaining the target line spectral frequency parameter is obtaining the target line spectral frequency parameter of the to-be-encoded signal through prediction, and the encoding rate is equal to 18 kilobits per second, the parameter value is 0.16; when the channel number indicates that the to-be-encoded signal is a secondary channel signal, the manner of obtaining the target line spectral frequency parameter is obtaining the target line spectral frequency parameter of the to-be-encoded signal through prediction, and the encoding rate is equal to 22 kilobits per second, the parameter value is 0.10; when the channel number indicates that the to-be-encoded signal is a secondary channel signal, the manner of obtaining the target line spectral frequency parameter is obtaining the target line spectral frequency parameter of the to-be-encoded signal through prediction, and the encoding rate is equal to 26 kilobits per second, the parameter value is 0.18; when the channel number indicates that the to-be-encoded signal is a secondary channel signal, the manner of obtaining the target line spectral frequency parameter is through prediction, and the encoding rate is greater than or equal to 34 kilobits per second, the parameter value is 0.25; when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is less than or equal to 14 kilobits per second, the parameter value is 0.19; when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 18 kilobits per second, the parameter value is 0.18; when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 22 kilobits per second, the parameter value is 0.11; when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 26 kilobits per second, the parameter value is 0.17; or when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is greater than or equal to 34 kilobits per second, the parameter value is 0.24.

With reference to the first aspect or the first possible implementation, in a fourth possible implementation, when the encoding mode includes the encoding rate, the channel number, and the manner of obtaining the target line spectral frequency parameter, the correspondence between the encoding mode and the corresponding parameter value includes at least one of the following relationships: When the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is less than or equal to 14 kilobits per second, the parameter value is 0.21; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 18 kilobits per second, the parameter value is 0.20; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 22 kilobits per second, the parameter value is 0.15; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 26 kilobits per second, the parameter value is 0.18; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is greater than or equal to 34 kilobits per second, the parameter value is 0.20; when the channel number indicates that the to-be-encoded signal is a primary channel signal, the manner of obtaining the target line spectral frequency parameter is obtaining the target line spectral frequency parameter of the to-be-encoded signal through prediction, and the encoding rate is less than or equal to 14 kilobits per second, the parameter value is 0.25; when the channel number indicates that the to-be-encoded signal is a primary channel signal, the manner of obtaining the target line spectral frequency parameter is obtaining the target line spectral frequency parameter of the to-be-encoded signal through prediction, and the encoding rate is equal to 18 kilobits per second, the parameter value is 0.22; when the channel number indicates that the to-be-encoded signal is a primary channel signal, the manner of obtaining the target line spectral frequency parameter is obtaining the target line spectral frequency parameter of the to-be-encoded signal through prediction, and the encoding rate is equal to 22 kilobits per second, the parameter value is 0.16; when the channel number indicates that the to-be-encoded signal is a primary channel signal, the manner of obtaining the target line spectral frequency parameter is obtaining the target line spectral frequency parameter of the to-be-encoded signal through prediction, and the encoding rate is equal to 26 kilobits per second, the parameter value is 0.16; or when the channel number indicates that the to-be-encoded signal is a primary channel signal, the manner of obtaining the target line spectral frequency parameter is obtaining the target line spectral frequency parameter of the to-be-encoded signal through prediction, and the encoding rate is greater than or equal to 34 kilobits per second, the parameter value is 0.17.

According to a second aspect, an apparatus for determining a weighting factor during stereo signal encoding is provided, where the apparatus includes a module configured to perform the method in any one of the first aspect or the possible implementations of the first aspect.

According to a third aspect, an apparatus for determining a weighting factor during stereo signal encoding is provided. The apparatus includes a memory and a processor. The memory is configured to store a program, and the processor is configured to execute a program. When executing the program in the memory, the processor implements the method in any one of the first aspect or the possible implementations of the first aspect.

According to a fourth aspect, a computer readable storage medium is provided. The computer readable storage medium stores program code to be executed by an apparatus or a device. The program code includes an instruction used to implement the method in any one of the first aspect or the possible implementations of the first aspect.

According to a fifth aspect, a chip is provided. The chip includes a processor and a communications interface. The communications interface is configured to communicate with an external device, and the processor is configured to implement the method in any one of the first aspect or the possible implementations of the first aspect.

In some embodiments, the chip may further include a memory. The memory stores an instruction, and the processor is configured to execute the instruction stored in the memory. When the instruction is executed, the processor is configured to implement the method in any one of the first aspect or the possible implementations of the first aspect.

In some embodiments, the chip may be integrated into a terminal device or a network device.

According to a sixth aspect, an embodiment of this disclosure provides a computer program product including an instruction. When the computer program product runs on a computer, the computer is enabled to perform the method according to the first aspect.

DESCRIPTION OF EMBODIMENTS

The following describes technical solutions of this disclosure with reference to accompanying drawings.

Figure 1:
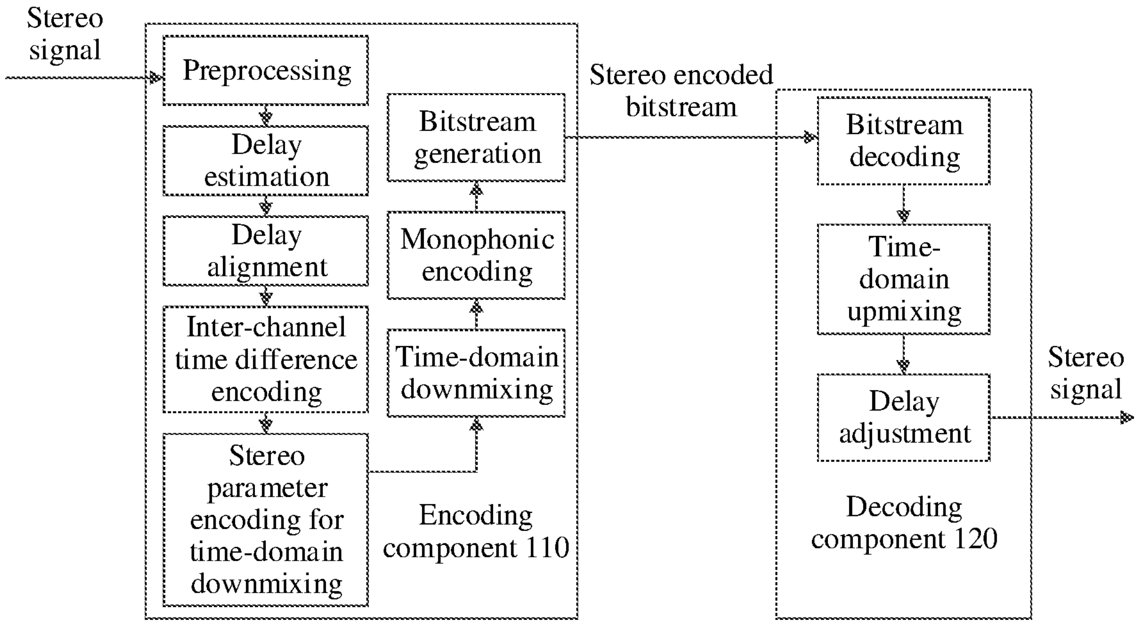
FIG. 1 is a schematic structural diagram of a stereo encoding and decoding system in time domain according to an embodiment of this disclosure.

FIG. 1 is a schematic structural diagram of a stereo encoding and decoding system in time domain according to an embodiment of this disclosure. The stereo encoding and decoding system includes an encoding component 110 and a decoding component 120.

It should be understood that a stereo signal in this disclosure may be an original stereo signal, or may be a stereo signal formed by two channels of signals included in a multi-channel signal, or may be a stereo signal formed by two channels of signals jointly generated by a plurality of channels of signals included in a multi-channel signal.

The encoding component 110 is configured to encode a stereo signal in time domain. In some embodiments, the encoding component 110 may be implemented by software, or may be implemented by hardware, or may be implemented in a form of a combination of software and hardware. This is not limited in this embodiment of this disclosure.

That the encoding component 110 encodes a stereo signal in time domain may include the following several steps.

(1) Perform time-domain preprocessing on an obtained stereo signal, to obtain a left channel signal obtained after time-domain preprocessing and a right channel signal obtained after time-domain preprocessing.

The stereo signal may be collected and sent to the encoding component 110 by a collection component. In some embodiments, the collection component and the encoding component 110 may be disposed in a same device, or may be disposed in different devices.

The left channel signal obtained after time-domain preprocessing and the right channel signal obtained after time-domain preprocessing are two channels of signals in the preprocessed stereo signal.

In some embodiments, time-domain preprocessing may include at least one of high-pass filtering processing, pre-emphasis processing, sampling rate conversion, and channel conversion. This is not limited in this embodiment of this disclosure.

(2) Perform delay estimation based on the left channel signal obtained after time-domain preprocessing and the right channel signal obtained after time-domain preprocessing, to obtain an inter-channel time difference between the left channel signal obtained after time-domain preprocessing and the right channel signal obtained after time-domain preprocessing.

For example, a cross-correlation function between a left channel signal and a right channel signal may be calculated based on the left channel signal obtained after time-domain preprocessing and the right channel signal obtained after time-domain preprocessing. Then, a maximum value of the cross-correlation function is searched for, and the maximum value is used as the inter-channel delay difference between the left channel signal obtained after time-domain preprocessing and the right channel signal obtained after time-domain preprocessing.

For another example, a cross-correlation function between a left channel signal and a right channel signal may be calculated based on the left channel signal obtained after time-domain preprocessing and the right channel signal obtained after time-domain preprocessing. Then, long-term smoothing is performed on a cross-correlation function between a left channel signal and a right channel signal of a current frame based on cross-correlation functions between left channel signals and right channel signals of previous L frames (L is an integer greater than or equal to 1) of the current frame, to obtain a smoothed cross-correlation function. Then, a maximum value of a smoothed cross-correlation function is searched for, and an index value corresponding to the maximum value is used as an inter-channel delay difference between a left channel signal obtained after time-domain preprocessing and a right channel signal obtained after time-domain preprocessing that are of the current frame.

For another example, inter-frame smoothing may be performed on an estimated inter-channel delay difference in a current frame based on inter-channel delay differences in previous M frames (M is an integer greater than or equal to 1) of the current frame, and a smoothed inter-channel delay difference is used as a final inter-channel delay difference between a left channel signal obtained after time-domain preprocessing and a right channel signal obtained after time-domain preprocessing that are of the current frame.

It should be understood that the foregoing method for estimating an inter-channel delay difference is merely an example, and this embodiment of this disclosure is not limited to the foregoing method for estimating an inter-channel delay difference.

(3) Perform delay alignment on the left channel signal obtained after time-domain preprocessing and the right channel signal obtained after time-domain preprocessing based on the inter-channel delay difference, to obtain a left channel signal obtained after delay alignment and a right channel signal obtained after delay alignment.

For example, one or two channels of signals in a left channel signal or a right channel signal of a current frame may be compressed or stretched based on an estimated inter-channel delay difference in the current frame and an inter-channel delay difference in a previous frame, so that no inter-channel delay difference exists between the left channel signal obtained after delay alignment and the right channel signal obtained after delay alignment.

(4) Encode the inter-channel delay difference to obtain an encoding index of the inter-channel delay difference.

(5) Calculate a stereo parameter that is used for time-domain downmixing, and encode the stereo parameter used for time-domain downmixing to obtain an encoding index of the stereo parameter used for time-domain downmixing.

The stereo parameter used for time-domain downmixing is used for performing time-domain downmixing on the left channel signal obtained after delay alignment and the right channel signal obtained after delay alignment.

(6) Perform time-domain downmixing on the left channel signal obtained after delay alignment and the right channel signal obtained after delay alignment based on the stereo parameter used for time-domain downmixing, to obtain a primary channel signal and a secondary channel signal.

The primary channel signal is used to represent related information between channels, and may also be referred to as a downmixed signal or a central channel signal. The secondary channel signal is used to represent difference information between channels, and may also be referred to as a residual signal or a side channel signal.

When the left channel signal obtained after delay alignment and the right channel signal obtained after delay alignment are aligned in time domain, the secondary channel signal is the smallest. In this case, the stereo signal has a best effect.

(7) Encode the primary channel signal and the secondary channel signal separately to obtain a first mono encoded bitstream corresponding to the primary channel signal and a second mono encoded bitstream corresponding to the secondary channel signal.

(8) Write the encoding index of the inter-channel delay difference, the encoding index of the stereo parameter, the first mono encoded bitstream, and the second mono encoded bitstream into a stereo encoded bitstream.

It should be noted that not all the foregoing steps are mandatory. For example, step (1) is not mandatory. If step (1) is not performed, the left channel signal and the right channel signal that are used for performing the delay estimation may be a left channel signal and a right channel signal in an original stereo signal. Herein, the left channel signal and the right channel signal in the original stereo signal refer to signals that are collected and obtained after analog-to-digital (A/D) conversion.

The decoding component 120 is configured to decode the stereo encoded bitstream that is generated by the encoding component 110, to obtain the stereo signal.

In some embodiments, the encoding component 110 may be connected to the decoding component 120 in a wired or wireless manner, and the decoding component 120 may obtain, by using a connection between the decoding component 120 and the encoding component 110, the stereo encoded bitstream generated by the encoding component 110. Alternatively, the encoding component 110 may store the generated stereo encoded bitstream in a memory, and the decoding component 120 reads the stereo encoded bitstream in the memory.

In some embodiments, the decoding component 120 may be implemented by software, or may be implemented by hardware, or may be implemented in a form of a combination of software and hardware. This is not limited in embodiments in accordance with this disclosure.

A process in which the decoding component 120 decodes the stereo encoded bitstream to obtain the stereo signal may include the following several steps.

(1) Decode the first mono encoded bitstream and the second mono encoded bitstream in the stereo encoded bitstream to obtain the primary channel signal and the secondary channel signal.

(2) Obtain, based on the stereo encoded bitstream, the encoding index of the stereo parameter used for time-domain upmixing, and perform time-domain upmixing on the primary channel signal and the secondary channel signal to obtain a left channel signal after time-domain upmixing and a right channel signal after time-domain upmixing.

(3) Obtain the encoding index of the inter-channel delay difference based on the stereo encoded bitstream, and perform delay adjustment on the left channel signal after time-domain upmixing and the right channel signal after time-domain upmixing to obtain the stereo signal.

In some embodiments, the encoding component 110 and the decoding component 120 may be disposed in a same device, or may be disposed in different devices. The device may be a mobile terminal that has an audio signal processing function, such as a mobile phone, a tablet computer, a laptop portable computer, a desktop computer, a Bluetooth speaker, a recording pen, or a wearable device, or may be a network element that has an audio signal processing capability in a core network or a wireless network. This is not limited in this embodiment of this disclosure.

Figure 2:
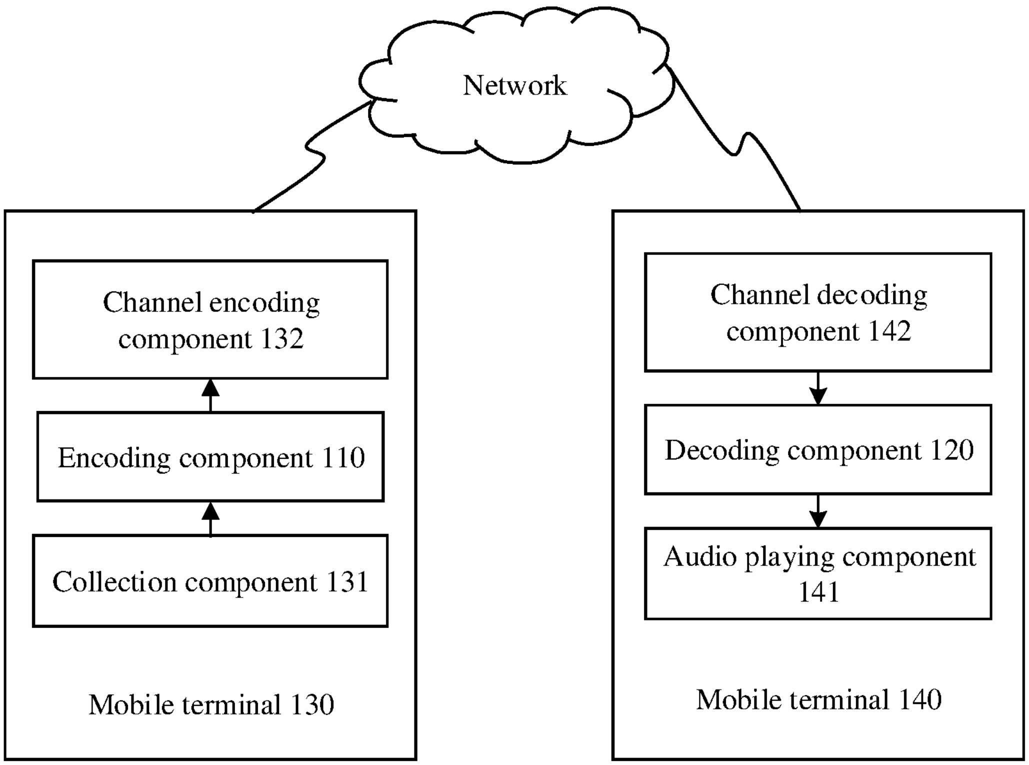
FIG. 2 is a schematic diagram of a mobile terminal according to an embodiment of this disclosure.

For example, as shown in FIG. 2, an example is used for description in which the encoding component 110 is disposed in a mobile terminal 130; the decoding component 120 is disposed in a mobile terminal 140; the mobile terminal 130 and the mobile terminal 140 are electronic devices that are independent of each other and that have an audio signal processing capability, for example, may be a mobile phone, a wearable device, a virtual reality (virtual reality, VR) device, or an augmented reality (augmented reality, AR) device; and the mobile terminal 130 is connected to the mobile terminal 140 by using a wireless or wired network.

In some embodiments, the mobile terminal 130 may include a collection component 131, the encoding component 110, and a channel encoding component 132, where the collection component 131 is connected to the encoding component 110, and the encoding component 110 is connected to the encoding component 132.

In some embodiments, the mobile terminal 140 may include an audio playing component 141, the decoding component 120, and a channel decoding component 142, where the audio playing component 141 is connected to the decoding component 120, and the decoding component 120 is connected to the channel decoding component 142.

After collecting a stereo signal by using the collection component 131, the mobile terminal 130 encodes the stereo signal by using the encoding component 110, to obtain a stereo encoded bitstream, and then encodes the stereo encoded bitstream by using the channel encoding component 132, to obtain a transmit signal.

The mobile terminal 130 sends the transmit signal to the mobile terminal 140 by using a wireless or wired network.

After receiving the transmit signal, the mobile terminal 140 decodes the transmit signal by using the channel decoding component 142 to obtain the stereo encoded bitstream, decodes the stereo encoded bitstream by using the decoding component 110 to obtain the stereo signal, and plays the stereo signal by using the audio playing component 141.

Figure 3:
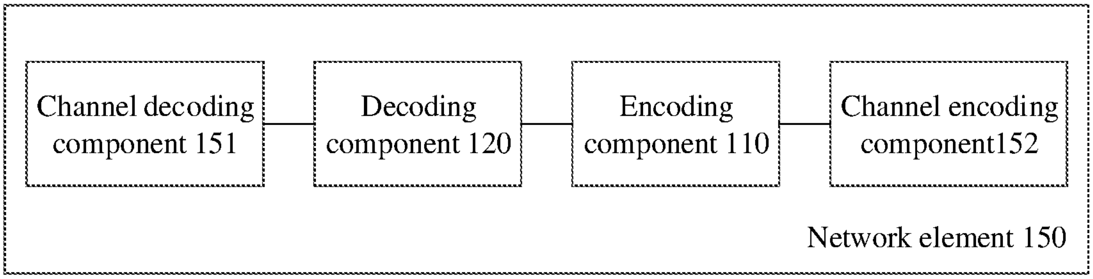
FIG. 3 is a schematic diagram of a network element according to an embodiment of this disclosure.

For example, as shown in FIG. 3, an example is used for description in which the encoding component 110 and the decoding component 120 are disposed in a same network element 150 that has an audio signal processing capability in a core network or wireless network.

In some embodiments, the network element 150 includes a channel decoding component 151, the decoding component 120, the encoding component 110, and a channel encoding component 152. The channel decoding component 151 is connected to the decoding component 120, the decoding component 120 is connected to the encoding component 110, and the encoding component 110 is connected to the channel encoding component 152.

After receiving a transmit signal sent by another device, the channel decoding component 151 decodes the transmit signal to obtain a first stereo encoded bitstream; the decoding component 120 decodes the first stereo encoded bitstream to obtain a stereo signal; the encoding component 110 encodes the stereo signal to obtain a second stereo encoded bitstream; and the channel encoding component 152 encodes the second stereo encoded bitstream to obtain a transmit signal.

Another device may be a mobile terminal that has an audio signal processing capability, or may be another network element that has an audio signal processing capability. This is not limited in this embodiment of this disclosure.

In some embodiments, the encoding component 110 and the decoding component 120 in the network element may transcode a stereo encoded bitstream sent by a mobile terminal.

In some embodiments, a device on which the encoding component 110 is installed may be referred to as an audio encoding device. In actual implementation, the audio encoding device may also have an audio decoding function. This is not limited in this embodiment of this disclosure.

In some embodiments, only a stereo signal is used as an example for description. In this disclosure, the audio encoding device may further process a multi-channel signal, and the multi-channel signal includes at least two channels of signals.

Various embodiments provide a new method for determining a weighting factor. Different from the prior art, in the method in this disclosure, a weighting factor related to an encoding mode is used to quantize or predict an LSF parameter. The weighting factor related to an encoding mode is obtained through calculation by using an energy spectrum of a linear prediction filter. For example, the weighting factor is obtained by calculating the energy spectrum of a linear prediction filter to the power p. Selection of p is related to the encoding mode, and p may be a number greater than 0 and less than 1.

The encoding mode may include one or more of an encoding rate, an encoding bandwidth, a channel number, and an LSF parameter quantization or prediction method.

For example, different p values may be set based on different encoding rates of a stereo encoder; different p values may be set based on different encoding bandwidths of a stereo encoder; different p values may be set based on different channel numbers; different p values may be set based on different LSF parameter quantization methods; different p values may be set based on different LSF parameter prediction methods; and different p values may be set based on whether an LSF parameter is quantized or predicted. Alternatively, the foregoing different setting conditions may be combined for setting different p values.

Figure 4:
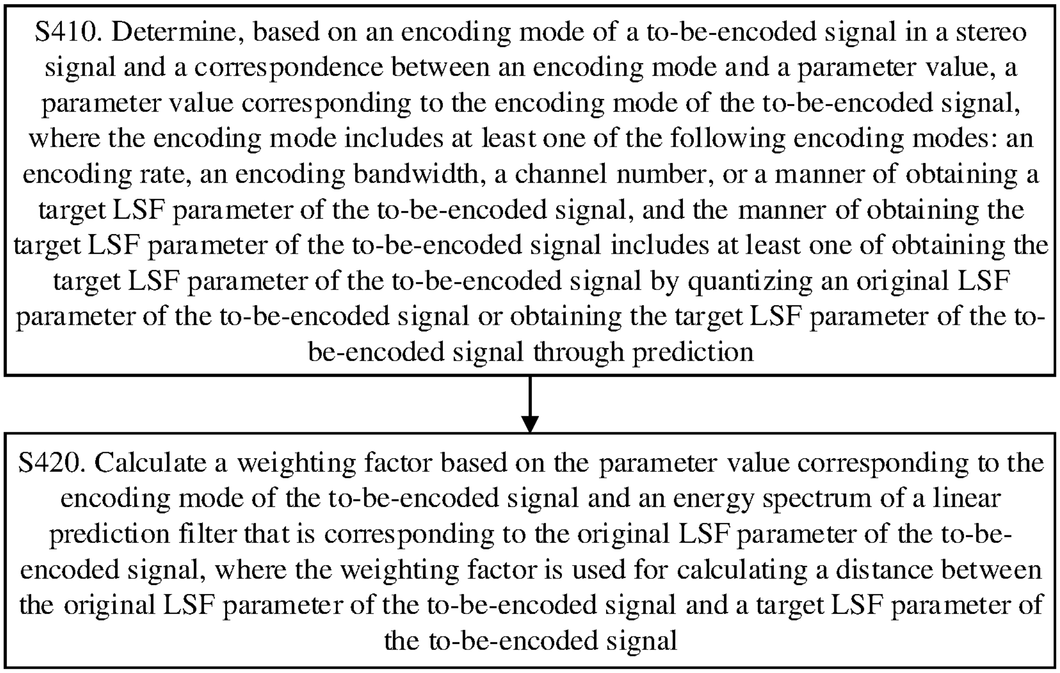
FIG. 4 is a schematic flowchart of a method for determining a weighting factor during stereo signal encoding according to an embodiment of this disclosure.

With reference to FIG. 4, the following describes a method for determining a weighting factor according to an embodiment of this disclosure. FIG. 4 is a schematic flowchart of a method for determining a weighting factor according to an embodiment of this disclosure. When an encoding component 110 performs quantization and encoding on at least one of an LSF parameter of a primary channel signal or an LSF parameter of a secondary channel signal, the method shown in FIG. 4 may be performed.

S410. Determine, based on an encoding mode of a to-be-encoded signal in a stereo signal and a correspondence between an encoding mode and a parameter value, a parameter value corresponding to the encoding mode of the to-be-encoded signal, where the encoding mode includes at least one of the following encoding modes: an encoding rate, an encoding bandwidth, a channel number, or a manner of obtaining a target LSF parameter of the to-be-encoded signal, and the manner of obtaining the target LSF parameter of the to-be-encoded signal includes at least one of obtaining the target LSF parameter of the to-be-encoded signal by quantizing an original LSF parameter of the to-be-encoded signal or obtaining the target LSF parameter of the to-be-encoded signal through prediction.

In the embodiments in accordance with this disclosure, the "at least one" may be understood as one or more; and "a plurality of" may be understood as two or more.

The to-be encoded signal may include one or more of a primary channel signal or a secondary channel signal.

The channel number is used to indicate that the to-be-encoded signal is a primary channel signal or a secondary channel signal. Alternatively, the channel number is a number of a to-be-encoded signal. The channel number may include one or two of a number of a primary channel signal or a number of a secondary channel signal.

For example, a one-bit value may be used to represent the channel number. When the bit value is "1", it may indicate that the to-be-encoded signal is a primary channel signal. When the bit value is "0", it may indicate that the to-be-encoded signal is a secondary channel signal.

For example, the channel number may be represented by using a bit position occupied by the to-be-encoded signal. For example, in a bitstream of a stereo signal, a to-be-encoded signal corresponding to a bit between an $i^{th}$ bit and a $j^{th}$ bit is a primary channel signal or a secondary channel signal, where i is an integer, and j is an integer greater than or equal to i.

The original LSF parameter of the to-be-encoded signal may be an LSF parameter directly obtained based on a to-be-encoded signal in the prior art.

The target LSF parameter of the to-be-encoded signal may be an LSF parameter that is of the to-be-encoded signal and that is to be written into a bitstream.

Predicting the target LSF parameter of the to-be-encoded signal may include: predicting the target LSF parameter of the to-be-encoded signal by using an inter-frame prediction method, or predicting the target LSF parameter of the to-be-encoded signal by using an intra-frame prediction method, or predicting the target LSF parameter of the to-be-encoded signal by using both the inter-frame prediction method and the intra-frame prediction method, or the like.

An example of predicting the target LSF parameter of the to-be-encoded signal by using the intra-frame prediction method includes: performing spectrum broadening on a quantized LSF parameter of a primary channel signal of a current frame, and predicting an LSF parameter obtained after spectrum broadening as a target LSF parameter of a secondary channel signal of the current frame.

S420. Calculate a weighting factor based on the parameter value corresponding to the encoding mode of the to-be-encoded signal and an energy spectrum of a linear prediction filter that is corresponding to the original LSF parameter of the to-be-encoded signal, where the weighting factor is used for calculating a distance between the original LSF parameter of the to-be-encoded signal and a target LSF parameter of the to-be-encoded signal.

The distance between the original LSF parameter of the to-be-encoded signal and the target LSF parameter of the to-be-encoded signal may be used to represent spectral distortion between the target LSF parameter of the to-be-encoded signal and the original LSF parameter of the to-be-encoded signal. Therefore, the weighting factor may also be understood as: The weighting factor is used for calculating the spectral distortion between the target LSF parameter of the to-be-encoded signal and the original LSF parameter of the to-be-encoded signal.

In the method in this embodiment in accordance with this disclosure, different parameter values are selected based on different encoding modes to calculate the weighting factor. This helps improve accuracy of the target LSF parameter obtained for the to-be-encoded signal through calculation based on the weighting factor, thereby helping reduce the spectral distortion of the target LSF parameter of the to-be-encoded signal, and further helping improve encoding quality of the stereo signal.

In this embodiment in accordance with this disclosure, the correspondence between the encoding mode and the parameter value may be preset. For example, the correspondence may be set by a person skilled in the art based on experience, or may be obtained through training based on a large amount of data.

In some implementations, the encoding mode may include the encoding rate and the channel number. To be specific, a correspondence between the channel number, the encoding rate, and the parameter value may be set.

For example, one or more correspondences in Table 1 may be set. In this way, when the channel number of the to-be-encoded signal indicates that the to-be-encoded signal is a primary channel signal, or when the to-be-encoded signal is a primary channel signal, or when the channel number is a number of a primary channel signal, the parameter value may be determined based on the encoding rate of the to-be-encoded signal and the correspondence in Table 1. Then, the weighting factor is calculated based on the parameter value. Kbps indicates kilobits per second.

TABLE 1

Correspondence between the encoding rate and the parameter value

| Encoding rate | Less than or equal to 14 Kbps | Equal to 18 Kbps | Equal to 22 Kbps | Equal to 26 Kbps | Greater than or equal to 34 Kbps |
|---|---|---|---|---|---|
| Parameter value | 0.25 | 0.22 | 0.16 | 0.16 | 0.17 |

For another example, one or more correspondences in Table 2 may be set. In this way, when the channel number indicates that the to-be-encoded signal is a secondary channel signal, or when the channel number of the to-be-encoded signal is a number of a secondary channel signal, or when the to-be-encoded signal is a secondary channel signal, the parameter value may be determined based on the encoding rate of the to-be-encoded signal and the correspondence in Table 2. Then, the weighting factor is calculated based on the parameter value.

TABLE 2

Correspondence between the encoding rate and the parameter value

| Encoding rate | Less than or equal to 14 Kbps | Equal to 18 Kbps | Equal to 22 Kbps | Equal to 26 Kbps | Greater than or equal to 34 Kbps |
|---|---|---|---|---|---|
| Parameter value | 0.19 | 0.18 | 0.11 | 0.17 | 0.24 |

For example, in a process of quantizing the primary channel signal, the parameter value used for calculating the weighting factor may be determined by using the correspondence in Table 1. In a process of quantizing the secondary channel signal, the parameter value used for calculating the weighting factor may be determined by using the correspondence in Table 2.

In some implementations, the encoding mode may include the encoding rate, the channel number, and the manner of obtaining the target line spectral frequency parameter. To be specific, a correspondence between the parameter value and the channel number, the encoding rate, and the manner of obtaining the target line spectral frequency parameter may be set.

For example, one or more correspondences in Table 3 may be set. In this way, when the channel number of the to-be-encoded signal indicates that the to-be-encoded signal is a primary channel signal and the target LSF parameter of the to-be-encoded signal needs to be obtained by quantizing the original LSF parameter of the to-be-encoded signal, the parameter value may be determined based on the encoding rate of the to-be-encoded signal and the correspondence in Table 3. Then, the weighting factor is calculated based on the parameter value.

TABLE 3

Correspondence between the encoding rate and the parameter value

| Encoding rate | Less than or equal to 14 Kbps | Equal to 18 Kbps | Equal to 22 Kbps | Equal to 26 Kbps | Greater than or equal to 3 4 Kbps |
|---|---|---|---|---|---|
| Parameter value | 0.25 | 0.22 | 0.16 | 0.16 | 0.17 |

For another example, one or more correspondences in Table 4 may be set. In this way, when the channel number of the to-be-encoded signal indicates that the to-be-encoded signal is a secondary channel signal and the target LSF parameter of the to-be-encoded signal needs to be obtained by quantizing the original LSF parameter of the to-be-encoded signal, the parameter value may be determined based on the encoding rate of the to-be-encoded signal and the correspondence in Table 4. Then, the weighting factor is calculated based on the parameter value.

TABLE 4

Correspondence between the encoding rate and the parameter value

| Encoding rate | Less than or equal to 14 Kbps | Equal to 18 Kbps | Equal to 22 Kbps | Equal to 26 Kbps | Greater than or equal to 34 Kbps |
|---|---|---|---|---|---|
| Parameter value | 0.19 | 0.18 | 0.11 | 0.17 | 0.24 |

For another example, one or more correspondences in Table 5 may be set. In this way, when the channel number of the to-be-encoded signal indicates that the to-be-encoded signal is a secondary channel signal and the target LSF parameter of the to-be-encoded signal needs to be obtained through prediction, the parameter value may be determined based on the encoding rate of the to-be-encoded signal and the correspondence in Table 5. Then, the weighting factor is calculated based on the parameter value.

TABLE 5

Correspondence between the encoding rate and the parameter value

| Encoding rate | Less than or equal to 14 Kbps | Equal to 18 Kbps | Equal to 22 Kbps | Equal to 26 Kbps | Greater than or equal to 34 Kbps |
|---|---|---|---|---|---|
| Parameter value | 0.17 | 0.16 | 0.10 | 0.18 | 0.25 |

For another example, one or more correspondences in Table 6 may be set. In this way, when the channel number of the to-be-encoded signal indicates that the to-be-encoded signal is a primary channel signal and the target LSF parameter of the to-be-encoded signal needs to be obtained through prediction, the parameter value may be determined based on the encoding rate of the to-be-encoded signal and the correspondence in Table 6. Then, the weighting factor is calculated based on the parameter value.

TABLE 6

Correspondence between the encoding rate and the parameter value

| Encoding rate | Less than or equal to 14 Kbps | Equal to 18 Kbps | Equal to 22 Kbps | Equal to 26 Kbps | Greater than or equal to 34 Kbps |
|---|---|---|---|---|---|
| Parameter value | 0.21 | 0.20 | 0.15 | 0.18 | 0.20 |

It should be understood that in this embodiment in accordance with this disclosure, Table 1 to Table 6 are merely examples, and Table 1 to Table 6 are merely examples of the one-to-one correspondence between the encoding rate and the parameter value in this embodiment of this disclosure. The examples of Table 1 to Table 6 are merely intended to help a person skilled in the art understand this embodiment of this disclosure, but are not intended to limit this embodiment of this disclosure to a specific value or a specific scenario shown in the examples. A person skilled in the art apparently can make various equivalent modifications or changes according to the examples shown in Table 1 to Table 6, and such modifications or changes also fall within the scope of the embodiments of this disclosure.

It should be further understood that, in this embodiment in accordance with this disclosure, a sequence of the encoding rates and the parameter values corresponding to the encoding rates in Table 1 to Table 6 is not limited. Positions of the encoding rates and the parameter values corresponding to the encoding rates in Table 1 to Table 6 may be mutually adjusted or randomly shuffled. This is not limited in this embodiment of this disclosure.

In S420, when the weighting factor is calculated based on the parameter value corresponding to the encoding mode of the to-be-encoded signal and the energy spectrum of the linear prediction filter that is corresponding to the original LSF parameter of the to-be-encoded signal, the weighting factor may be calculated based on the energy spectrum of the linear prediction filter that is corresponding to the original LSF parameter of the to-be-encoded signal, where the weighting factor $w_i$ satisfies the following:

$$w_i = \|A(LSF(i))\|^{-p}$$

where A(·) represents the power spectrum of a linear prediction filter corresponding to the original LSF parameter of the to-be-encoded signal; LSF represents a vector of the original LSF parameter of the to-be-encoded signal; i represents an index of the vector, where i=1, . . . , M, and M is a linear prediction order; and $\|\cdot\|^{-p}$ represents solving a 2-norm, which is of the vector, to the power of −p, where p represents a parameter value.

In the formula, p may be a number greater than 0 and less than 1. Generally, a value range of p may be [0.1, 0.25].

After the foregoing formula is expanded, the weighting factor satisfies the following:

$$w_i = \left\{\left[1 + \sum_{i=1}^{M} b_i \cdot \cos(2\pi \cdot LSF(i)/FS)\right]^2 + \left[\sum_{i=1}^{M} b_i \cdot \sin(2\pi \cdot LSF(i)/FS)\right]^2\right\}^{-p}$$

where $b_i$ represents an $i^{th}$ coefficient of linear prediction coefficients corresponding to the original LSF parameter of the to-be-encoded signal, where i=1, . . . , M, and M is a linear prediction order; LSF(i) is an $i^{th}$ vector of the original LSF parameter; and FS is a sampling rate for encoding.

It should be understood that the foregoing formula is merely an example, and any variation, modification, or change of the foregoing formula also falls within the scope of this embodiment of this disclosure.

It should be further understood that a method for setting a correspondence between the parameter value and one or more other encoding modes of the encoding rate, the encoding bandwidth, the channel number, and the manner of obtaining the target line spectral frequency parameter of the to-be-encoded signal is similar to the foregoing described method, and details are not described herein again.

Figure 5:
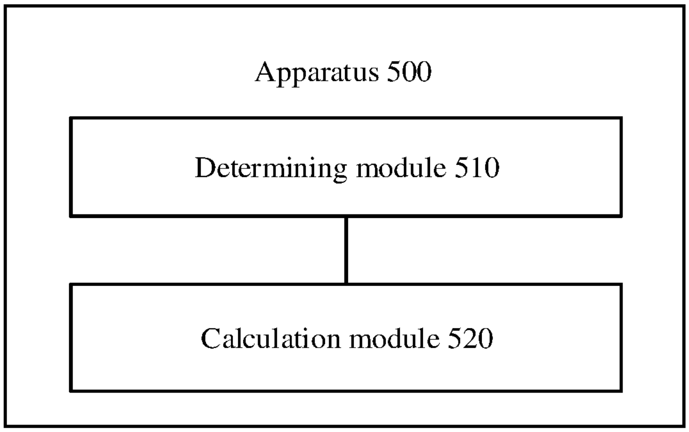
FIG. 5 is a schematic structural diagram of an apparatus for determining a weighting factor during stereo signal encoding according to an embodiment of this disclosure.

FIG. 5 is a schematic block diagram of an apparatus 500 for determining a weighting factor according to an embodiment of this disclosure. It should be understood that the apparatus 500 is merely an example.

In some implementations, both a determining module 510 and a calculation module 520 may be included in the encoding component 110 of the mobile terminal 130.

The determining module 510 is configured to determine, based on an encoding mode of a to-be-encoded signal in a stereo signal and a correspondence between an encoding mode and a parameter value, a parameter value corresponding to the encoding mode of the to-be-encoded signal, where the encoding mode includes at least one of the following encoding modes: an encoding rate, an encoding bandwidth, a channel number, or a manner of obtaining a target line spectral frequency parameter of the to-be-encoded signal, where the manner of obtaining the target line spectral frequency parameter of the to-be-encoded signal includes at least one of obtaining the target line spectral frequency parameter of the to-be-encoded signal by quantizing an original line spectral frequency parameter of the to-be-encoded signal or obtaining the target line spectral frequency parameter of the to-be-encoded signal through prediction.

The calculation module 520 is configured to calculate a weighting factor based on the parameter value corresponding to the encoding mode of the to-be-encoded signal and an energy spectrum of a linear prediction filter that is corresponding to the original line spectral frequency parameter of the to-be-encoded signal, where the weighting factor is used for calculating a distance between the original line spectral frequency parameter and the target original line spectral frequency parameter.

In some embodiments, the parameter value corresponding to the encoding mode of the to-be-encoded signal, the energy spectrum of the linear prediction filter, and the weighting factor satisfy the following:

$$w_i = \|A(LSF(i))\|^{-p}$$

where $w_i$ represents the weighting factor; $A(\cdot)$ represents the energy spectrum of the linear prediction filter; LSF represents a vector of the original line spectral frequency parameter; i represents an index of the vector, where $1 \le i \le M$, and M is a linear prediction order; p represents the parameter value corresponding to the encoding mode of the to-be-encoded signal; and $\|\cdot\|^{-p}$ represents solving a 2-norm, which is of the vector, to the power of −p, where p is a number greater than 0 and less than 1.

In some embodiments, when the encoding mode includes the encoding rate and the channel number, the correspondence includes at least one of the following relationships: When the channel number indicates that the to-be-encoded signal is a primary channel signal, and the encoding rate is less than or equal to 14 kilobits per second, the parameter value is 0.25; when the channel number indicates that the to-be-encoded signal is a primary channel signal, and the encoding rate is equal to 18 kilobits per second, the parameter value is 0.22; when the channel number indicates that the to-be-encoded signal is a primary channel signal, and the encoding rate is equal to 22 kilobits per second, the parameter value is 0.16; when the channel number indicates that the to-be-encoded signal is a primary channel signal, and the encoding rate is equal to 26 kilobits per second, the parameter value is 0.16; when the channel number indicates that the to-be-encoded signal is a primary channel signal, and the encoding rate is greater than or equal to 34 kilobits per second, the parameter value is 0.17; when the channel number indicates that the to-be-encoded signal is a secondary channel signal, and the encoding rate is less than or equal to 14 kilobits per second, the parameter value is 0.19; when the channel number indicates that the to-be-encoded signal is a secondary channel signal, and the encoding rate is equal to 18 kilobits per second, the parameter value is 0.18; when the channel number indicates that the to-be-encoded signal is a secondary channel signal, and the encoding rate is equal to 22 kilobits per second, the parameter value is 0.11; when the channel number indicates that the to-be-encoded signal is a secondary channel signal, and the encoding rate is equal to 26 kilobits per second, the parameter value is 0.17; or when the channel number indicates that the to-be-encoded signal is a secondary channel signal, and the encoding rate is greater than or equal to 34 kilobits per second, the parameter value is 0.24.

In some embodiments, when the encoding mode includes the encoding rate, the channel number, and the manner of obtaining the target line spectral frequency parameter, the correspondence includes at least one of the following relationships: When the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is less than or equal to 14 kilobits per second, the parameter value is 0.25; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 18 kilobits per second, the parameter value is 0.22; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 22 kilobits per second, the parameter value is 0.16; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 26 kilobits per second, the parameter value is 0.16; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is greater than or equal to 34 kilobits per second, the parameter value is 0.17; when the channel number indicates that the to-be-encoded signal is a secondary channel signal, the manner of obtaining the target line spectral frequency parameter is obtaining the target line spectral frequency parameter of the to-be-encoded signal through prediction, and the encoding rate is less than or equal to 14 kilobits per second, the parameter value is 0.17; when the channel number indicates that the to-be-encoded signal is a secondary channel signal, the manner of obtaining the target line spectral frequency parameter is obtaining the target line spectral frequency parameter of the to-be-encoded signal through prediction, and the encoding rate is equal to 18 kilobits per second, the parameter value is 0.16; when the channel number indicates that the to-be-encoded signal is a secondary channel signal, the manner of obtaining the target line spectral frequency parameter is obtaining the target line spectral frequency parameter of the to-be-encoded signal through prediction, and the encoding rate is equal to 22 kilobits per second, the parameter value is 0.10; when the channel number indicates that the to-be-encoded signal is a secondary channel signal, the manner of obtaining the target line spectral frequency parameter is obtaining the target line spectral frequency parameter of the to-be-encoded signal through prediction, and the encoding rate is equal to 26 kilobits per second, the parameter value is 0.18; when the channel number indicates that the to-be-encoded signal is a secondary channel signal, the manner of obtaining the target line spectral frequency parameter is through prediction, and the encoding rate is greater than or equal to 34 kilobits per second, the parameter value is 0.25; when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is less than or equal to 14 kilobits per second, the parameter value is 0.19; when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 18 kilobits per second, the parameter value is 0.18; when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 22 kilobits per second, the parameter value is 0.11; when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 26 kilobits per second, the parameter value is 0.17; or when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is greater than or equal to 34 kilobits per second, the parameter value is 0.24.

In some embodiments, when the encoding mode includes the encoding rate, the channel number, and the manner of obtaining the target line spectral frequency parameter, the correspondence includes at least one of the following relationships: When the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is less than or equal to 14 kilobits per second, the parameter value is 0.21; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 18 kilobits per second, the parameter value is 0.20; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 22 kilobits per second, the parameter value is 0.15; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 26 kilobits per second, the parameter value is 0.18; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is greater than or equal to 34 kilobits per second, the parameter value is 0.20; when the channel number indicates that the to-be-encoded signal is a primary channel signal, the manner of obtaining the target line spectral frequency parameter is obtaining the target line spectral frequency parameter of the to-be-encoded signal through prediction, and the encoding rate is less than or equal to 14 kilobits per second, the parameter value is 0.25; when the channel number indicates that the to-be-encoded signal is a primary channel signal, the manner of obtaining the target line spectral frequency parameter is obtaining the target line spectral frequency parameter of the to-be-encoded signal through prediction, and the encoding rate is equal to 18 kilobits per second, the parameter value is 0.22; when the channel number indicates that the to-be-encoded signal is a primary channel signal, the manner of obtaining the target line spectral frequency parameter is obtaining the target line spectral frequency parameter of the to-be-encoded signal through prediction, and the encoding rate is equal to 22 kilobits per second, the parameter value is 0.16; when the channel number indicates that the to-be-encoded signal is a primary channel signal, the manner of obtaining the target line spectral frequency parameter is obtaining the target line spectral frequency parameter of the to-be-encoded signal through prediction, and the encoding rate is equal to 26 kilobits per second, the parameter value is 0.16; or when the channel number indicates that the to-be-encoded signal is a primary channel signal, the manner of obtaining the target line spectral frequency parameter is obtaining the target line spectral frequency parameter of the to-be-encoded signal through prediction, and the encoding rate is greater than or equal to 34 kilobits per second, the parameter value is 0.17.

It should be understood that the apparatus 500 may be configured to perform the method described in FIG. 4. For brevity, details are not described herein again.

Figure 6:
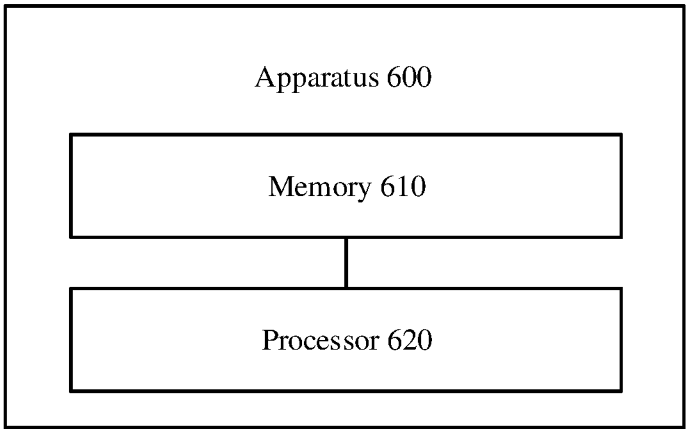
FIG. 6 is a schematic structural diagram of an apparatus for determining a weighting factor during stereo signal encoding according to another embodiment of this disclosure.

FIG. 6 is a schematic block diagram of an apparatus 600 for determining a weighting factor according to an embodiment of this disclosure. It should be understood that the apparatus 600 is merely an example.

A memory 610 is configured to store a program.

A processor 620 is configured to execute the program stored in the memory. When the program in the memory is executed, the processor is configured to:

determine, based on an encoding mode of a to-be-encoded signal in a stereo signal and a correspondence between an encoding mode and a parameter value, a parameter value corresponding to the encoding mode of the to-be-encoded signal, where the encoding mode includes at least one of the following encoding modes: an encoding rate, an encoding bandwidth, a channel number, or a manner of obtaining a target line spectral frequency parameter of the to-be-encoded signal, where the manner of obtaining the target line spectral frequency parameter of the to-be-encoded signal includes at least one of obtaining the target line spectral frequency parameter of the to-be-encoded signal by quantizing an original line spectral frequency parameter of the to-be-encoded signal, or obtaining the target line spectral frequency parameter of the to-be-encoded signal through prediction; and calculate a weighting factor based on the parameter value corresponding to the encoding mode of the to-be-encoded signal and an energy spectrum of a linear prediction filter that is corresponding to the original line spectral frequency parameter of the to-be-encoded signal, where the weighting factor is used for calculating a distance between the original line spectral frequency parameter and the target original line spectral frequency parameter.

In some embodiments, the parameter value corresponding to the encoding mode of the to-be-encoded signal, the energy spectrum of the linear prediction filter, and the weighting factor satisfy the following:

$$w_i = \|A(LSF(i))\|^{-p}$$

where $w_i$ represents the weighting factor; $A(\cdot)$ represents the energy spectrum of the linear prediction filter; LSF represents a vector of the original line spectral frequency parameter; i represents an index of the vector, where $1 \le i \le M$, and M is a linear prediction order; p represents the parameter value; and $\|\cdot\|^{-p}$ represents solving a 2-norm, which is of the vector, to the power of −p, where p is a number greater than 0 and less than 1.

In some embodiments, when the encoding mode includes the encoding rate and the channel number, the correspondence includes at least one of the following relationships: When the channel number indicates that the to-be-encoded signal is a primary channel signal, and the encoding rate is less than or equal to 14 kilobits per second, the parameter value is 0.25; when the channel number indicates that the to-be-encoded signal is a primary channel signal, and the encoding rate is equal to 18 kilobits per second, the parameter value is 0.22; when the channel number indicates that the to-be-encoded signal is a primary channel signal, and the encoding rate is equal to 22 kilobits per second, the parameter value is 0.16; when the channel number indicates that the to-be-encoded signal is a primary channel signal, and the encoding rate is equal to 26 kilobits per second, the parameter value is 0.16; when the channel number indicates that the to-be-encoded signal is a primary channel signal, and the encoding rate is greater than or equal to 34 kilobits per second, the parameter value is 0.17; when the channel number indicates that the to-be-encoded signal is a secondary channel signal, and the encoding rate is less than or equal to 14 kilobits per second, the parameter value is 0.19; when the channel number indicates that the to-be-encoded signal is a secondary channel signal, and the encoding rate is equal to 18 kilobits per second, the parameter value is 0.18; when the channel number indicates that the to-be-encoded signal is a secondary channel signal, and the encoding rate is equal to 22 kilobits per second, the parameter value is 0.11; when the channel number indicates that the to-be-encoded signal is a secondary channel signal, and the encoding rate is equal to 26 kilobits per second, the parameter value is 0.17; or when the channel number indicates that the to-be-encoded signal is a secondary channel signal, and the encoding rate is greater than or equal to 34 kilobits per second, the parameter value is 0.24.

In some embodiments, when the encoding mode includes the encoding rate, the channel number, and the manner of obtaining the target line spectral frequency parameter, the correspondence includes at least one of the following relationships: When the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is less than or equal to 14 kilobits per second, the parameter value is 0.25; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 18 kilobits per second, the parameter value is 0.22; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 22 kilobits per second, the parameter value is 0.16; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 26 kilobits per second, the parameter value is 0.16; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is greater than or equal to 34 kilobits per second, the parameter value is 0.17; when the channel number indicates that the to-be-encoded signal is a secondary channel signal, the manner of obtaining the target line spectral frequency parameter is obtaining the target line spectral frequency parameter of the to-be-encoded signal through prediction, and the encoding rate is less than or equal to 14 kilobits per second, the parameter value is 0.17; when the channel number indicates that the to-be-encoded signal is a secondary channel signal, the manner of obtaining the target line spectral frequency parameter is obtaining the target line spectral frequency parameter of the to-be-encoded signal through prediction, and the encoding rate is equal to 18 kilobits per second, the parameter value is 0.16; when the channel number indicates that the to-be-encoded signal is a secondary channel signal, the manner of obtaining the target line spectral frequency parameter is obtaining the target line spectral frequency parameter of the to-be-encoded signal through prediction, and the encoding rate is equal to 22 kilobits per second, the parameter value is 0.10; when the channel number indicates that the to-be-encoded signal is a secondary channel signal, the manner of obtaining the target line spectral frequency parameter is obtaining the target line spectral frequency parameter of the to-be-encoded signal through prediction, and the encoding rate is equal to 26 kilobits per second, the parameter value is 0.18; when the channel number indicates that the to-be-encoded signal is a secondary channel signal, the manner of obtaining the target line spectral frequency parameter is through prediction, and the encoding rate is greater than or equal to 34 kilobits per second, the parameter value is 0.25; when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is less than or equal to 14 kilobits per second, the parameter value is 0.19; when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 18 kilobits per second, the parameter value is 0.18; when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 22 kilobits per second, the parameter value is 0.11; when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 26 kilobits per second, the parameter value is 0.17; or when the channel number indicates that the to-be-encoded signal is a secondary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is greater than or equal to 34 kilobits per second, the parameter value is 0.24.

In some embodiments, when the encoding mode includes the encoding rate, the channel number, and the manner of obtaining the target line spectral frequency parameter, the correspondence includes one or more of the following relationships: When the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is less than or equal to 14 kilobits per second, the parameter value is 0.21; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 18 kilobits per second, the parameter value is 0.20; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 22 kilobits per second, the parameter value is 0.15; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is equal to 26 kilobits per second, the parameter value is 0.18; when the channel number indicates that the to-be-encoded signal is a primary channel signal, the manner of obtaining the target line spectral frequency parameter is obtaining the target line spectral frequency parameter of the to-be-encoded signal by quantizing the original line spectral frequency parameter of the to-be-encoded signal, and the encoding rate is greater than or equal to 34 kilobits per second, the parameter value is 0.20; when the channel number indicates that the to-be-encoded signal is a primary channel signal, the manner of obtaining the target line spectral frequency parameter is obtaining the target line spectral frequency parameter of the to-be-encoded signal through prediction, and the encoding rate is less than or equal to 14 kilobits per second, the parameter value is 0.25; when the channel number indicates that the to-be-encoded signal is a primary channel signal, the manner of obtaining the target line spectral frequency parameter is obtaining the target line spectral frequency parameter of the to-be-encoded signal through prediction, and the encoding rate is equal to 18 kilobits per second, the parameter value is 0.22; when the channel number indicates that the to-be-encoded signal is a primary channel signal, the manner of obtaining the target line spectral frequency parameter is obtaining the target line spectral frequency parameter of the to-be-encoded signal through prediction, and the encoding rate is equal to 22 kilobits per second, the parameter value is 0.16; when the channel number indicates that the to-be-encoded signal is a primary channel signal, the manner of obtaining the target line spectral frequency parameter is obtaining the target line spectral frequency parameter of the to-be-encoded signal through prediction, and the encoding rate is equal to 26 kilobits per second, the parameter value is 0.16; or when the channel number indicates that the to-be-encoded signal is a primary channel signal, the manner of obtaining the target line spectral frequency parameter is obtaining the target line spectral frequency parameter of the to-be-encoded signal through prediction, and the encoding rate is greater than or equal to 34 kilobits per second, the parameter value is 0.17.

It should be understood that the apparatus 600 may be configured to perform the method described in FIG. 4. For brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular disclosures and design constraint conditions of the technical solutions. A person skilled in the art may use different methods to implement the described functions for each particular disclosure, but it should not be considered that the implementation goes beyond the scope of this disclosure.

It may be understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

It should be understood that, the processor in the embodiments of this disclosure may be a central processing unit (CPU), or may further be another general purpose processor, a digital signal processor (DSP), an disclosure specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

The invention claimed is:

1. A method comprising:

obtaining a multi-channel signal including at least two channel signals;

obtaining a manner for obtaining a target line spectral frequency (LSF) parameter of the multi-channel signal, wherein the manner is either a first manner of obtaining the target LSF parameter by quantizing an original LSF parameter of the multi-channel signal or a second manner of obtaining the target LSF parameter by prediction;

obtaining, based on the manner for obtaining the target LSF and an energy spectrum of a linear prediction filter corresponding to the original LSF parameter, a weighting factor; and obtaining, based on the weighting factor, a spectral distortion between the original LSF parameter and the target LSF parameter.

2. The method according to claim 1, further comprising:

obtaining a parameter value based on the manner for obtaining the target LSF; and obtaining the weighting factor based on the parameter value and the energy spectrum.

3. The method according to claim 2, wherein the parameter value, the energy spectrum, and the weighting factor satisfy the following equation:

$$w_i = \|A(LSF(i))\|^{-p},$$

wherein $w_i$ represents the weighting factor;

$A(\cdot)$ represents the energy spectrum of the linear prediction filter;

LSF represents a vector of the original LSF parameter;

i represents an index of the vector, wherein $1 \le i \le M$, and M is a linear prediction order, p represents the parameter value; and $\|\cdot\|^{-p}$ represents solving a 2-norm, which is of the vector, to a power of −p, wherein p is a number greater than 0 and less than 1.

4. The method according to claim 1, wherein the weight factor is greater than 0 and less than 1.

5. The method according to claim 2, wherein the parameter value is greater than 0 and less than 1.

6. The method according to claim 5, wherein when the manner is the first manner, the parameter value is equal to 0.25, 0.22, 0.16, or 0.17.

7. The method according to claim 5, wherein when the manner is the second manner, the parameter value is equal to 0.17, 0.16, 0.10, 0.18, or 0.25.

8. An apparatus, comprising:

at least one processor; and a memory storing computer executable instructions that, when executed by the at least one processor, cause the apparatus to:

obtain a multi-channel signal including at least two channel signals;

obtain a manner for obtaining a target line spectral frequency (LSF) parameter of the multi-channel signal, wherein the manner is either a first manner of obtaining the target LSF parameter by quantizing an original LSF parameter of the multi-channel signal or a second manner of obtaining the target LSF parameter by prediction;

obtain, based on the manner for obtaining the target LSF and an energy spectrum of a linear prediction filter corresponding to the original LSF parameter, a weighting factor; and obtain, based on the weighting factor, a spectral distortion between the original LSF parameter and the target LSF parameter.

9. The apparatus according to claim 8, wherein the computer executable instructions, when executed by the at least one processor, further cause the apparatus to:

obtain a parameter value based on the manner for obtaining the target LSF; and obtain the weighting factor based on the parameter value and the energy spectrum.

10. The apparatus according to claim 9, wherein the parameter value, the energy spectrum, and the weighting factor satisfy the following equation:

$$w_i = \|A(LSF(i))\|^{-p},$$

wherein $w_i$ represents the weighting factor;

A(·) represents the energy spectrum of the linear prediction filter;

LSF represents a vector of the original LSF parameter;

i represents an index of the vector, wherein 1≤i≤M, and M is a linear prediction order;

p represents the parameter value; and $\|\cdot\|^{-p}$ represents solving a 2-norm, which is of the vector, to a power of −p, wherein p is a number greater than 0 and less than 1.

11. The apparatus according to claim 8, wherein the weight factor is greater than 0 and less than 1.

12. The apparatus according to claim 9, wherein the parameter value is greater than 0 and less than 1.

13. The apparatus according to claim 12, wherein when the manner is the first manner, the parameter value is equal to 0.25, 0.22, 0.16, or 0.17.

14. The apparatus according to claim 12, wherein when the manner is the second manner, the parameter value is equal to 0.17, 0.16, 0.10, 0.18, or 0.25.

15. A non-transitory computer-readable storage medium storing computer instructions that, when executed by one or more processors, cause one or more processors to perform operations comprising:

obtaining a multi-channel signal including at least two channel signals;

obtaining a manner for obtaining a target line spectral frequency (LSF) parameter of the multi-channel signal, wherein the manner is either a first manner of obtaining the target LSF parameter by quantizing an original LSF parameter of the multi-channel signal or a second manner of obtaining the target LSF parameter by prediction;

obtaining, based on the manner for obtaining the target LSF and an energy spectrum of a linear prediction filter corresponding to the original LSF parameter, a weighting factor; and obtaining, based on the weighting factor, a spectral distortion between the original LSF parameter and the target LSF parameter.

16. The non-transitory computer-readable storage medium according to claim 15, wherein the operations further comprise:

obtaining a parameter value based on the manner for obtaining the target LSF; and obtaining the weighting factor based on the parameter value and the energy spectrum.

17. The non-transitory computer-readable storage medium according to claim 16, wherein the parameter value, the energy spectrum, and the weighting factor satisfy the following equation:

$$w_i = \|A(LSF(i))\|^{-p},$$

wherein $w_i$ represents the weighting factor;

A(·) represents the energy spectrum of the linear prediction filter;

LSF represents a vector of the original LSF parameter;

i represents an index of the vector, wherein 1≤i≤M, and M is a linear prediction order;

p represents the parameter value; and p represents solving a 2-norm, which is of the vector, to a power of −p, wherein p is a number greater than 0 and less than 1.

18. The non-transitory computer-readable storage medium according to claim 15, wherein the weight factor is greater than 0 and less than 1.

19. The non-transitory computer-readable storage medium according to claim 16, wherein the parameter value is greater than 0 and less than 1.

20. The non-transitory computer-readable storage medium according to claim 19, wherein when the manner is the first manner, the parameter value is equal to 0.25, 0.22, 0.16, or 0.17.

* * * * *